United States Patent [19]

Priaroggia

[11] Patent Number: 4,717,232
[45] Date of Patent: Jan. 5, 1988

[54] SUBMARINE CABLE JOINT WITH OPTOELECTRONIC REPEATERS

[75] Inventor: Paolo G. Priaroggia, Milan, Italy

[73] Assignee: Societa' Cavi Pirelli S.p.A., Milan, Italy

[21] Appl. No.: 756,777

[22] Filed: Jul. 18, 1985

[30] Foreign Application Priority Data

Aug. 1, 1984 [IT] Italy .................. 22161 A/84

[51] Int. Cl.⁴ .................. B02B 6/36; B02B 7/26
[52] U.S. Cl. .................. 350/96.20; 350/96.21; 350/96.22; 350/96.23
[58] Field of Search ............... 350/96.20, 96.21, 96.22, 350/96.23

[56] References Cited

U.S. PATENT DOCUMENTS 4,657,343  4/1987  Oldham et al. .................. 350/96.21

Primary Examiner—William L. Sikes
Assistant Examiner—Robert E. Wise
Attorney, Agent, or Firm—Brooks Haidt Haffner & Delahunty

[57] ABSTRACT

A joint between a pair of optical fiber submarine cables having a central armoring in the form of a wire rope, optical fibers disposed around the armoring and a sheath around the optical fibers. The joint contains a watertight housing for optoelectronic repeaters which has a central through-cavity into which the end portions of the armoring, or an interconnecting armoring, extend, and the end portions are mechanically secured together within the through-cavity, or to the ends of the interconnecting armoring which are outside the housing. The sheaths are interconnected by a metallic casing surrounding and secured to the housing for the repeaters, and the sheaths may also be connected to the housing by further metal casings. The housing for the repeaters is secured to the armorings of the cables or the interconnecting armoring.

10 Claims, 4 Drawing Figures

SUBMARINE CABLE JOINT WITH OPTOELECTRONIC REPEATERS

The present invention relates to a submarine line for optical fiber telecommunications and of the type which incorporates optoelectronic repeaters for the signals transmitted.

A typical such line comprises at least two submarine optical fiber cables disposed in series, between which there is interposed and connected a device containing optoelectronic repeaters, i.e. those elements which amplify and transmit to the optical fibers of the downstream cable, the signals received from the optical fibers of the upstream cable.

The connection, between such device and the submarine cables, must not only provide for the joining of the optical fibers of the cables to the optoelectronic repeaters but also must ensure continuity between the mechanically resistant armoring of the cables and prevent any infiltration of water into the joining zone.

The submarine cables of the known types of such lines include a mechanically resistant armoring, formed by a structure made of steel wires which circumscribe the metallic, watertight sheath and hence, also circumscribe the zone where the optical fibers are positioned.

In the known lines, the continuity between the armorings of the cables, in correspondence to the device containing the optoelectronic repeaters, is realized in one of the following two ways.

In the first way, the single wires of the cables' armoring, are fixed to the casing of the device which is provided with slots for effecting the connection. In this instance, the casing constitutes an integral part of the armoring of the line. Therefore, it has to be capable of resisting the mechanical stresses which occur during the cable-laying or the cable-raising operations of the line itself.

A second way is to directly fix the wires of the armorings of the two cables to one another, after having superimposed them over the casing of the device which contains the optoelectronic repeaters.

In both these ways, it is necessary to effect a mechanical connection for each wire of the armorings. This renders the realizing of the mechanical continuity, between the armorings, quite complex and arduous.

A further drawback of said known lines lies in an inadequate reliability of the connection existing between the optical fibers of the cables and the optoelectronic repeaters. This inadequate reliability of the connections depends substantially upon the difficulties had when manufacturing them.

In fact, in the known lines, the optical fibers, of the cables to be connected to the optoelectronic repeaters, are circumscribed by the mechanically resistant armoring of the cables themselves. Hence it is difficult to have access to the optical fibers. Because of this, difficulties arise in effecting the connections between the optical fibers, with the result that there is an inadequate reliability of these connections.

Even the watertight connection, between the sheaths of the cables and the casing of the device containing optoelectronic repeaters, is difficult to effect in the known submarine lines because even this connection is obstructed by the presence of the mechanically resistant armoring of the cables.

One object of the present invention is a submarine line for optical fiber telecommunications which incorporates devices which contain optoelectronic repeaters and which avoids the drawbacks mentioned hereabove which are found in the known lines.

The principal object of the present invention is a submarine line for optical fiber telecommunications, comprising at least two submarine optical fiber cables which are provided with sheaths disposed in series, between which cables there is interposed a device for containing the optoelectronic repeaters of the transmitted signals, said line being characterized by the fact that:

(1) the cables have their entire mechanically resistant armoring disposed in the radially innermost zone;

(2) the device, containing the optoelectronic repeaters, is provided with a through-cavity which receives at least one component of a mechanical joint connection for the armorings of the cables, systems for blocking the device also being provided; and (3) at least one watertight, metallic casing circumscribing the device containing the optoelectronic repeaters.

Other objects and advantages of the present invention will be apparent from the following detailed description of the presently preferred embodiments thereof, which description should be considered in conjunction with the accompanying drawings in which.

As previously stated, a submarine line for optical fiber telecommunications usually comprises at least two submarine optical fibers cables, disposed in series, between which there is interposed a device containing optoelectronic repeaters for the signals transmitted.

In a line, according to the invention, the optical fibers cables are of the type wherein the mechanically resistant armoring is disposed in the radially innermost zone of the cables themselves. Cables of this type are, for example, cables described in co-pending U.S. patent applications Ser. Nos. 723,265 and 723,039 filed Apr. 15, 1985 and assigned to the assignee of the application.

Figure 1:
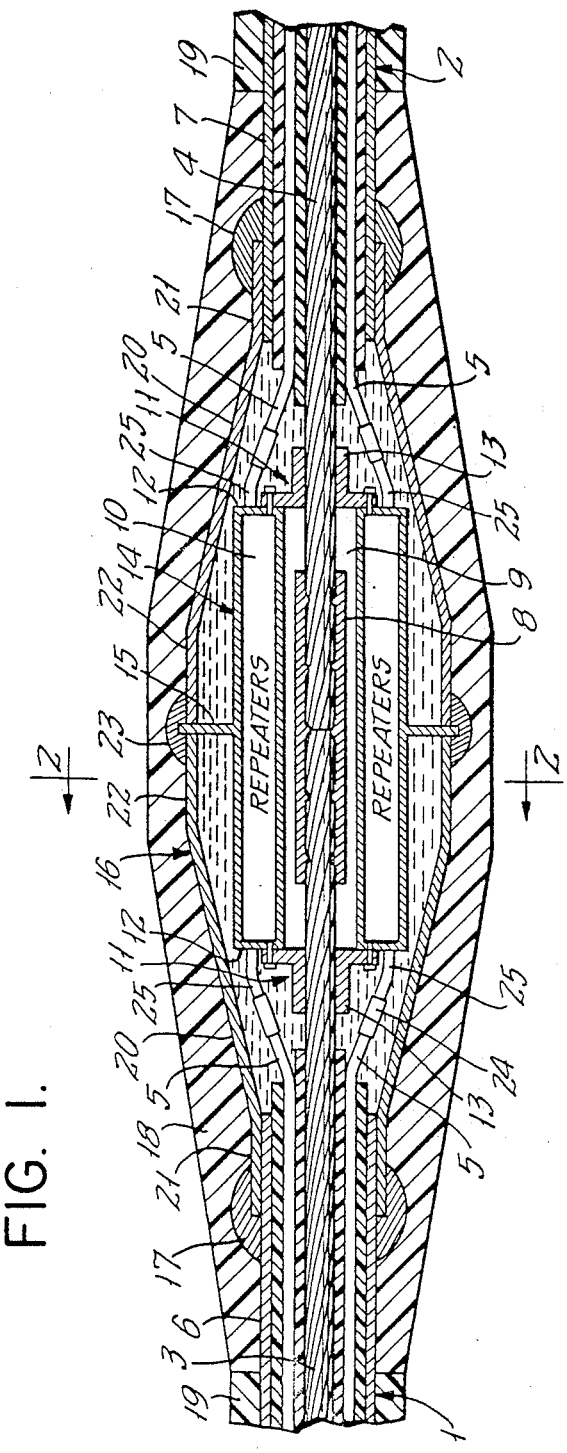
FIG. 1 is a longitudinal cross-section of a tract of a line according to the invention, such tract including a device containing the optoelectronic repeaters for the signals which are transmitted by the optical fibers.
Figure 2:
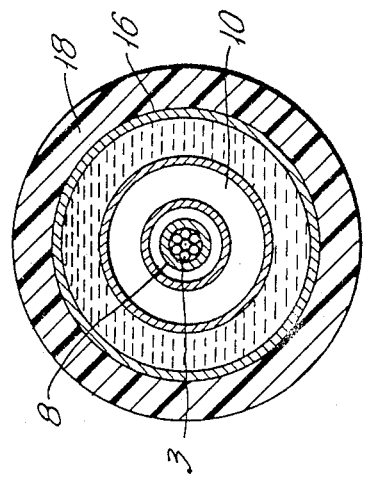
FIG. 2 is a transversal cross-section of the embodiment shown in FIG. 1 and is taken along the line II—II in FIG. 1.

In the FIGS. 1 and 2, there is shown a tract of a submarine line including the invention and which includes a device containing the optoelectronic repeaters.

As can be seen in FIGS. 1 and 2, at the facing extremities of two cables 1 and 2, of the previously described type, the components have been stripped in a staggered way. In particular, what have been stripped are:

(a) the armorings 3 and 4, constituted by antitorsional, compact wire ropes, disposed at the radially innermost zone of the cables 1 and 2.

(b) the small tubes 5, filled with an incompressible fluid, for example, a petroleum jelly, a silicone grease, and such like, wherein the optical fibers are loosely housed; and (c) the sheaths 6 and 7.

The armorings 3 and 4 of the cables 1 and 2, are secured to one another by a mechanical connection. In general, at least one component of this mechanical connection is housed inside the cavity 9 of a housing 14, which contains optoelectronic repeaters devices 10 for the transmitted signals. Such repeaters are not illustrated since they are of a known type.

In FIG. 1, the mechanical connection for the armorings 3 and 4 is constituted solely by a compressing clamp 8 which secures the armorings 3 and 4 together, end to end. As an alternative, the clamp can be replaced by a hardened welding together of the ends of the armorings. The clamp 8 is housed inside the through-cavity 9 of the watertight, cylindrical, metallic housing 14 for the devices 10.

The housing 14 is provided with means for securing it to the armorings 3 and 4, in such a way that said housing 14 does not have to undergo any rotation or longitudinal movement with respect to the armorings. The connection is realized through flanges 11, which are secured by screws, or welded to, the bases 12 of the housing 14 for the devices 10, and the collars 13 are integral with the flanges 11. The collars 13 are secured to the armorings 3 and 4 of the cable lengths.

On the cylindrical surface of the housing 14 the devices 10, there is present a flange 15 by the means of which there is effected a mechanical connection between device 10 and the watertight, metallic casing 16 (to be described hereinafter) which is fixed in a sealed manner at point 17, for example, by welding, to the metallic sheaths 6 and 7 of the cables, or by mastics should the sheaths 6 and 7 be of plastic material. The flange 15 may be integral with, or welded to, the housing 14 for the devices 10.

Around the metallic casing 16, there is disposed a plastic layer 18 which is secured to the plastic sheaths 19 of the cables.

Around the plastic layer 18, further protective layers (not shown) may be provided, such as, for example, wound antishipworm tapes, i.e. if the cables 1 and 2 have such further protective layers.

As previously stated, a watertight, metallic casing 16 is secured, in a sealed manner, to the sheaths 6 and 7 of the cables, and said casing encloses the housing 14. Said watertight metallic casing 16, is a casing which is resistant to hydrostatic pressure to which it will be subjected after the line is layed. Said casing 16 comprises two symmetrical sleeves, each one of which has an intermediate frusto-conical portion 20 at the bases of which there are, in the axial direction, a first and a second cylindrical portion 21 and 22.

The cylindrical portions 21, are fitted onto the stripped extremities of the sheaths 6 and 7. Also, they are secured to these extremities, in a sealed manner, through welding at 17, if said sheaths 6 and 7 are metallic, or by a mastic, if said sheaths 6 and 7 are made of plastic material.

The cylindrical portions 22 are similarly secured in a sealed manner. Moreover, they are secured, for example, by means of the welding 23, to the flange 15 of the housing 14 for the device 10. In this manner, there is realized a mechanical connection between the watertight, metallic casing 16 and the housing 14 which is mechanically connected through the flanges 11 and collars 13, to the armorings of the cables. As a consequence, during the operations of laying the line, the weight of the metallic casing 16, is supported by the cables' armorings 3 and 4 of the cables, and it does not subject the connection at 17, (through which the sealing is realized between the sheaths 6 and 7 and the casing 16) to any mechanical stresses.

According to an alternative embodiment, said flange 15 extending from the cylindrical surface of the housing 14 for the devices 10, is omitted. In this instance, around the outer surface of the layer 18, there is provided a metallic armoring, which extends, for a certain length, over the outer surfaces of the layers 19 of the cables 1 and 2. The only purpose of the latter armoring is to unload the weight of the metallic casing 16 upon the outer surfaces of said cables.

In general, in a line according to the invention, elements are provided for preventing the weight of the metallic casing 16 from bearing heavily down upon the sealing connections at 17, by means of which the casing 16 is secured to the sheaths 6 and 7.

Preferably, the casing 16 is filled with an incompressible fluid such as, for example, a petroleum jelly, a silicone grease, and such like. The connections 24 between the cables' optical fibers, housed in the small tubes 5, and also the optical fibers housed in the sealed branches 25 which extend from the device 10 and connect to the optoelectronic repeaters are enclosed in the casing 16.

Obviously, if the optical fibers of the cables 1 and 2 are bare, i.e. not loosely housed in the small tubes 5, only the terminal portions of the optical fibers would be present inside the casing 16. In such a case, the connections, between the optical fibers of the cables and those of the branches 25, would be constituted exclusively by a butt-welding.

Moreover, the casing 16 also encloses the connections (not shown) between the electrical conductors (which are the armorings and the cables' metallic sheaths, or a conductive element, should the cables' sheaths be of plastic material) incorporated in the cables and the electrical circuits (of the device 10), which are necessary for the functioning of the optoelectronic repeaters.

Figures 3, 4:
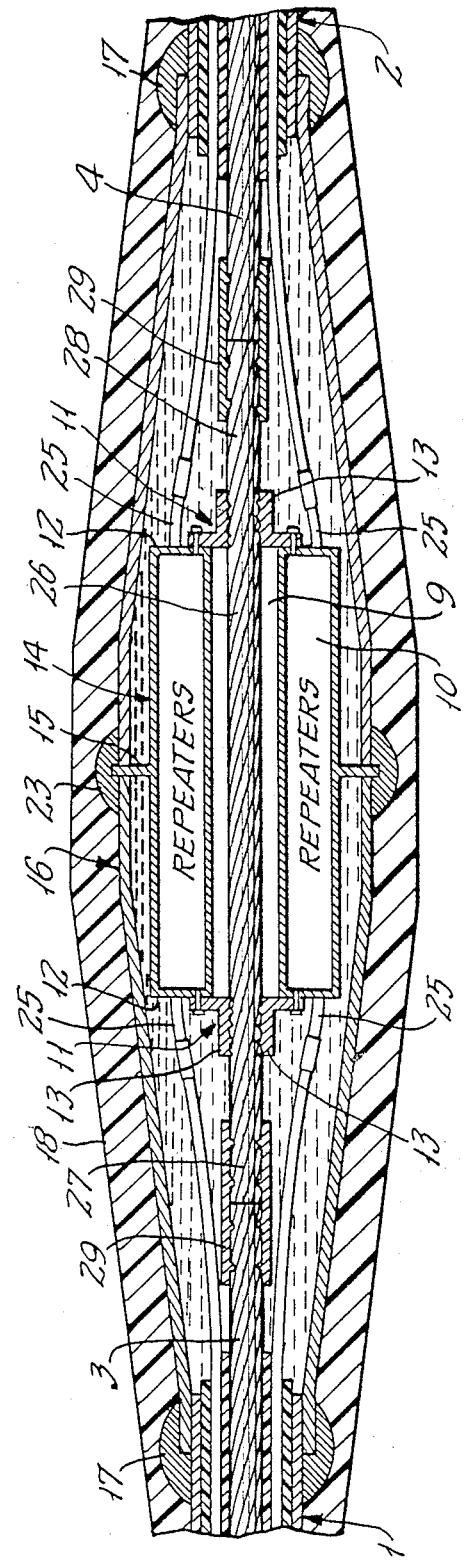
FIG. 3 illustrates, in longitudinal cross-section, an alternative embodiment of the invention.
FIG. 4 illustrates in longitudinal cross-section, a further embodiment of the invention.

In FIG. 3 there is shown an alternative embodiment of the invention, which differs from the one shown in FIGS. 1 and 2 only by the mechanical connection between armorings of the cables.

As can be seen in FIG. 3, inside the through-cavity 9 of the housing 14 there is present a traction-resistant element 26, consisting, for example, of a metallic rod, a length of antitorsional, compact metallic rope, and such like, the extremities 27 and 28 of which extend, for a certain length from the through-cavity 9.

In this form embodiment, the collars 13 of the flanges 11, which are fixed to the casings' base 12 of the housing 14, are secured to traction-resistant element 26.

Moreover, the armorings 3 and 4 of the cables 1 and 2, are disposed end-to-end with the extremities 27 and 28 of the element 26, and they are secured to the extremities 27 and 28 by compressing clamps 29 which are disposed externally to the through-cavity 9. Alternatively, the extremities 27 and 28 may be secured to the armorings 3 and 4 by means of a hardened welding.

FIG. 4 shows another alternative embodiment which differs from the one shown in FIGS. 1 and 2 only by the presence of a pair of auxiliary, metallic casings 30.

As can be seen in FIG. 4, each of the auxiliary, metallic casings 30, has a frusto-conical form. The lesser bases 31 of the frusto-conical casings 30 is sealingly fixed (at 32) to the sheath, 6 or 7, of a cable. The greater bases 35 of the casings 30 is sealingly fixed to a ring 34 extending from the housing 14 for the devices 10.

The auxiliary, metallic casings 30 (these latter also being filled with an incompressible fluid selected from those previously cited) circumscribe, in a sealed manner, the connections 24 between the optical fibers housed inside the small tubes 5 of the cables and the optical fibers of the sealed branches 25 which extend from the device 10. The casings 3 also improve the reliability, as regards watertightness, due to their presence.

This last effect renders the embodiment shown in FIG. 4 particularly apt for being employed in cases when the cables' optical fibers are bare i.e. not housed inside the above-mentioned small tubes 5.

From the description of the previously given embodiments and also from the following considerations, it can be understood how, through the present invention, the objects of the invention have been achieved First and foremost, in a submarine line for optical fiber telecommunications, according to the invention, the mechanical continuity between the armorings of the cables corresponding to the housing 14 containing the optoelectronic repeaters, may be rapidly and simply achieved. In fact, said continuity is obtained simultaneously for all the components of the two cables' mechanical armorings, i.e. instead of the wires being connected singly as is done in the known lines Moreover, the connection between the optical fibers of the cables and those of the branches which extend from the housing 14 which contains the optoelectronic repeaters, is reliable because, when executing it, there are no elements present that could give rise to obstructions and/or disturbances.

Finally, the watertightness of the line, where the housing 14 containing the optoelectronic repeaters is disposed, can be assured to a maximum degree in view of the fact that, even here, nothing exists which could impede the executing of the welding, or the sealing, between metallic casing and the sheaths of the cables.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A joint between a pair of submarine, optical fiber cables, each cable comprising a central armoring for withstanding the stresses on the cable including the hydrostatic pressure stresses, signal transmitting, optical fibers disposed around the central armoring and a sheath around the optical fibers, said joint comprising:
   interconnecting means mechanically interconnecting the end of the central armoring of one cable to the end of the central armoring of the other cable;
   a watertight housing around said interconnecting means and secured to one of said central armoring and said interconnecting means for preventing movement of said housing relative to said central armoring, said housing enclosing optoelectronic repeaters connected to said optical fibers for receiving and transmitting signals transmitted by said optical fibers; and
   a watertight, metallic casing surrounding said housing.

2. A joint as set forth in claim 1 wherein said casing is secured at its ends to said sheaths in a watertight manner.

3. A joint as set forth in claim 2 further comprising means supporting said casing from said cables for preventing the weight of said casing from bearing heavily on its connections with said sheaths.

4. A joint as set forth in claims 1 or 2 wherein a substantially incompressible fluid fills any otherwise empty spaces within said casing.

5. A joint as set forth in claim 1 wherein said interconnecting means comprises a clamp engaging the end portion of the central armoring of one cable and the end portion of the central armoring of the other cable, said clamp being surrounded by said housing, and wherein said housing is secured to said central armoring.

6. A joint as set forth in claim 1 wherein said interconnecting means comprises a traction-resistant element having a length in the direction of the axis of the cables greater than the length of said housing in said direction, whereby end portions of said element extend axially outwardly of said housing, and clamping means securing said end portions of said element to the respective central armorings of said cables and wherein said housing is secured to said element.

7. A joint as set forth in claim 1 wherein said casing comprises a pair of sleeves, one of said sleeves being secured in watertight relation at one end to one end of the other of said sleeves and at its other end to the sheath of one of said cables and said other of said sleeves being secured in watertight relation at its other end to the sheath of the other of said cables.

8. A joint as set forth in claim 7 wherein said housing comprises a radially extending flange secured in watertight relation to said sleeves intermediate said one end of said one of said sleeves and said one end of said other of said sleeves.

9. A joint as set forth in claim 1 further comprising within said casing a pair of frusto-conical sleeves, one of said sleeves being secured in watertight relation at one end to the sheath of one of said cables and at its other end to said housing and the other of said sleeves being secured in watertight relation at one end to the sheath of the other of said cables and at its other end to said housing.

10. A joint as set forth in claim 1 wherein said housing comprises a radially extending flange secured to said casing.

* * * * *